United States Patent
Bauer et al.

(10) Patent No.: US 9,809,295 B1
(45) Date of Patent: Nov. 7, 2017

(54) FLIGHT ACTUATED DOOR SEAL

(71) Applicants: Robert E. Bauer, Torrance, CA (US); John C. Rufino, Long Beach, CA (US)

(72) Inventors: Robert E. Bauer, Torrance, CA (US); John C. Rufino, Long Beach, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 8 days.

(21) Appl. No.: 15/175,890

(22) Filed: Jun. 7, 2016

(51) Int. Cl.
*B64C 1/14* (2006.01)
*F16J 15/06* (2006.01)
*E06B 7/205* (2006.01)

(52) U.S. Cl.
CPC ............ *B64C 1/1461* (2013.01); *E06B 7/205* (2013.01); *F16J 15/061* (2013.01)

(58) Field of Classification Search
USPC .................... 244/129.4, 129.5, 130, 131
See application file for complete search history.

(56) References Cited

U.S. PATENT DOCUMENTS

| | | | |
|---|---|---|---|
| 6,109,564 A * | 8/2000 | Bui .................... | B64G 1/52 220/230 |
| 6,170,781 B1 | 1/2001 | Sherrill et al. | |
| 8,403,265 B2 * | 3/2013 | Gowing ................ | B64C 1/14 244/129.5 |
| 2002/0060270 A1 * | 5/2002 | Buchs ................ | B64C 1/1407 244/129.5 |
| 2010/0096504 A1 | 4/2010 | Candela et al. | |

FOREIGN PATENT DOCUMENTS

EP  2851282 A  3/2015

* cited by examiner

*Primary Examiner* — J. Woodrow Eldred
(74) *Attorney, Agent, or Firm* — Tarolli, Sundheim, Covell & Tummino LLP

(57) ABSTRACT

A sealing system for an aircraft having an opening and a door movable between an open condition spaced from the opening and a closed condition covering and sealing the opening includes a cover plate connected to the aircraft adjacent the opening. A first magnetic coupling secured to the cover plate includes a first plurality of magnets. A second magnetic coupling configured for securing to the door includes a second plurality of magnets. The first magnetic coupling is repelled by the second magnetic coupling when the couplings have a first degree of alignment with one another. This causes the cove plot move away from the door. The first magnetic coupling is attracted to the second magnetic coupling when the couplings have a second degree of alignment with one another greater than the first degree, causing the magnetic couplings to engage one another and seal the opening in the aircraft.

20 Claims, 8 Drawing Sheets

FLIGHT ACTUATED DOOR SEAL

TECHNICAL FIELD

The present invention relates generally to door seals and, in particular, relates to a conformal aerodynamic seal (CAS) for aircraft.

BACKGROUND

Cover plates are frequently used on the exterior of aircraft in certain regions of the aircraft skin for aerodynamic reasons, particularly in order to cover potential clearances, e.g., on doors or loading hatches. Such cover plates can be set in vibration due to air turbulances in a relative wind and thereby generate annoying noise. This may in turn be associated with increased aerodynamic drag and increased fuel consumption. The cover plate may also undesirably alter the outer mold line (OML) of the aircraft, thereby affecting the radar cross-section (RCS) of the aircraft.

SUMMARY

In accordance with an aspect of the present invention, a sealing system for an aircraft having an opening and a door movable between an open condition spaced from the opening and a closed condition covering and sealing the opening includes a cover plate connected to the aircraft adjacent the opening. A first magnetic coupling is secured to the cover plate and includes a first plurality of magnets. A second magnetic coupling is configured to be secured to the door and includes a second plurality of magnets. The first magnetic coupling is repelled by the second magnetic coupling when the magnetic couplings have a first degree of alignment with one another, causing the cover plate to move away from the door. The first magnetic coupling is attracted to the second magnetic coupling when the magnetic couplings have a second degree of alignment with one another greater than the first degree, causing the magnetic couplings to engage one another and seal the opening in the aircraft.

In accordance with another aspect of the present invention, a sealing system for an aircraft having an opening and a door movable between an open condition spaced from the opening and a closed condition covering and sealing the opening includes a cover plate magnetically coupled to the aircraft adjacent the opening. A shuttle is secured to the cover plate and provided in a recess of the aircraft adjacent the opening. A first magnetic coupling is secured to the shuttle and includes a first plurality of magnets. A second magnetic coupling is configured to be secured to the door and includes a second plurality of magnets. The first magnetic coupling is repelled by the second magnetic coupling when the magnetic couplings have a first degree of alignment with one another such that the cover plate slides with the shuttle and first magnetic coupling away from the door. The first magnetic coupling is attracted to the second magnetic coupling when the magnetic couplings have a second degree of alignment with one another greater than the first degree such that the cover plate slides with the shuttle and first magnetic coupling towards the door until the magnetic couplings engage one another and seal the opening in the aircraft.

Other objects and advantages and a fuller understanding of the invention will be had from the following detailed description and the accompanying drawings.

DETAILED DESCRIPTION

Figure 1:
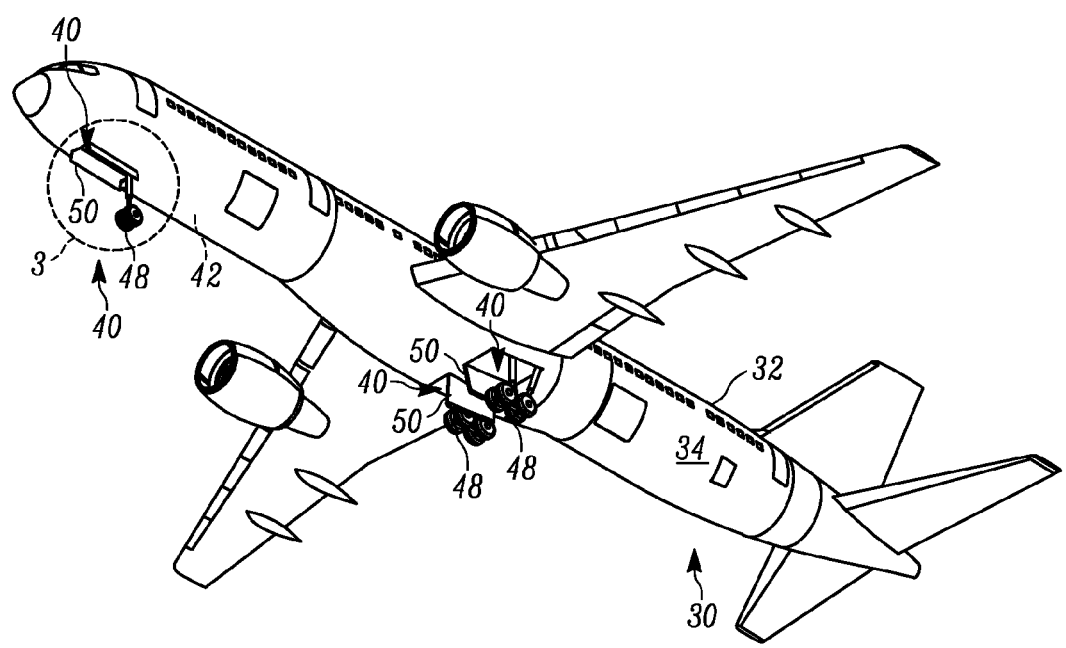
FIG. 1 is a schematic illustration of an aircraft having a sealing mechanism in accordance with an aspect of the present invention.

The present invention relates generally to door seals and, in particular, relates to a CAS for aircraft. FIGS. 1-9 illustrate a sealing mechanism 100 for an aircraft 30 in accordance with the present invention. Referring to FIG. 1, the aircraft 30 includes a frame 32 having a skin or outer mold line (OML) 34. One or more openings 40 extend through the OML 34 to an interior 42 of the aircraft 30. Each door 50 is secured to the aircraft 30 via one or more hinges 52 and selectively opens and closes the opening 40. The doors 50 can be located anywhere along the aircraft 30 and constitutes a flight-actuated door, such as for landing gear 48. During flight, the door(s) 50 may flex under stress relative to the OML 34. Such movement can create gaps or discontinuities in the aircraft 30 profile, thereby degrading the aircraft's radar cross-section (RCS) performance. To this end, the sealing mechanism 100 of the present invention helps improve the RCS of the aircraft 30.

Figure 2:
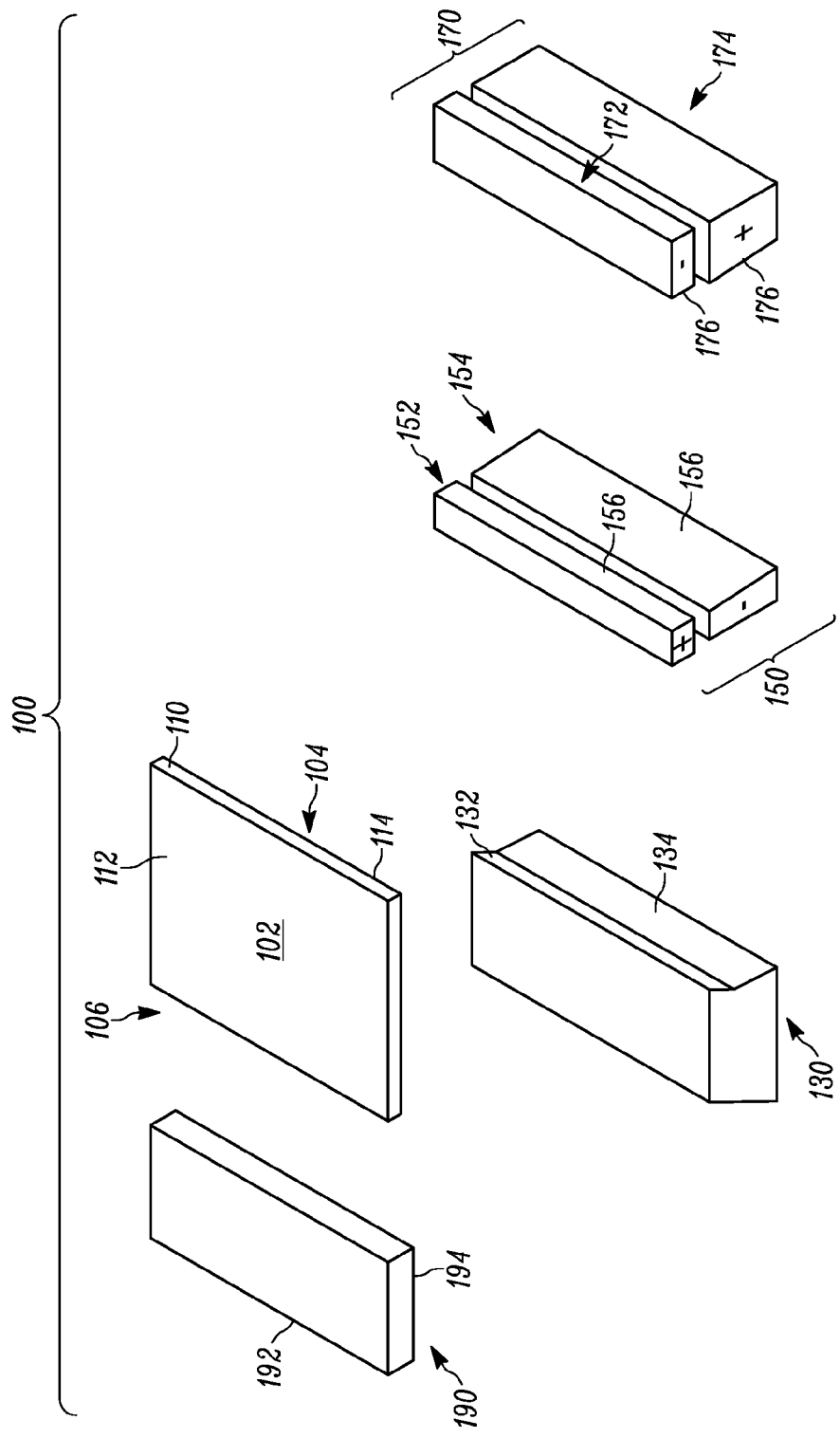
FIG. 2 is an exploded assembly view of the sealing mechanism of FIG. 1.

Referring further to FIG. 2, a sealing mechanism 100 is provided for each door 50 to help maintain the doors in a closed, sealed condition during flight. The sealing mechanism 100 includes a cover plate 102 having first and second ends 104, 106 and shaped to the contour of the OML 34, e.g., planar or arcuate. The first end 104 terminates at an edge 110. The cover plate 102 further includes a first side 112 and an opposing second side 114. A shuttle 130 is secured to the second side 114 of the cover plate 102 and extends parallel to the edge 110. The shuttle 130 is elongated and includes a substantially rectangular portion 132 and a tapered portion 134 extending from the rectangular portion.

The sealing mechanism 100 also includes a pair of magnetic couplings 150, 170 secured to the cover plate 102 and door 50, respectively, for selectively securing the door to the cover plate in an air-tight manner. The magnetic coupling 150 is secured to the shuttle 130 and the second side 114 of the cover plate 102. Consequently, the cover plate 102, shuttle 130, and magnetic coupling 150 cooperate to form an assembled unit.

The magnetic coupling 150 includes first and second magnets 152, 154 stacked atop one another to define a coupling surface 156. The first and second magnets 152, 154 are contoured to the shapes of the portions 132, 134 of the shuttle 130 and abut the portions when the sealing mechanism 100 is assembled. The first and second magnets 152, 154 have opposite polarities from one another, e.g., the first magnet has a positive polarity and the second magnet has a negative polarity. Although two magnets 152, 154 are shown it will be appreciated that the magnetic coupling 150 can include more or fewer magnets. Accordingly, the shuttle 130 can be modified to have more or fewer portions for mating with the magnets.

Figure 3:
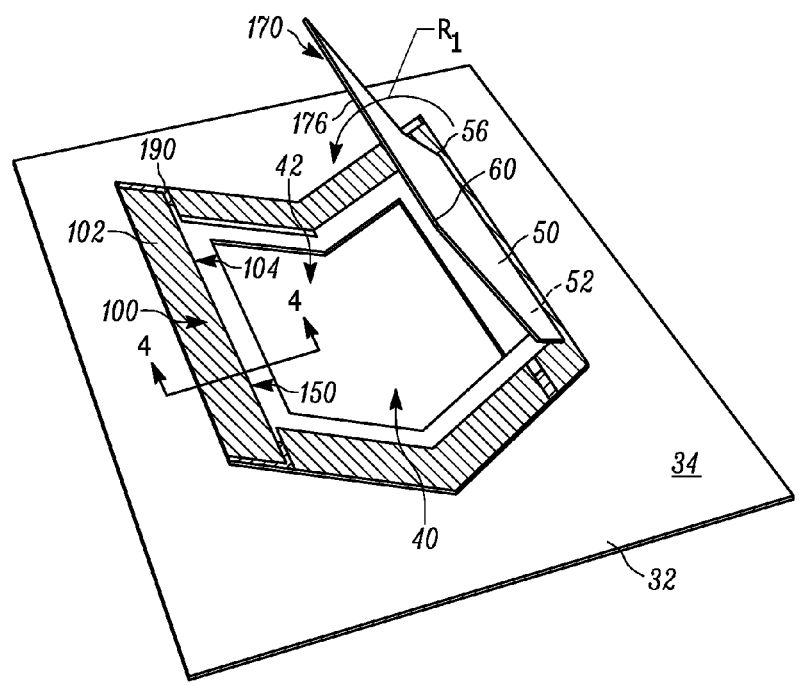
FIG. 3 is an enlarged view of a portion of the aircraft of FIG. 1 with a door in an opened condition to expose an opening in the aircraft.
Figure 4:
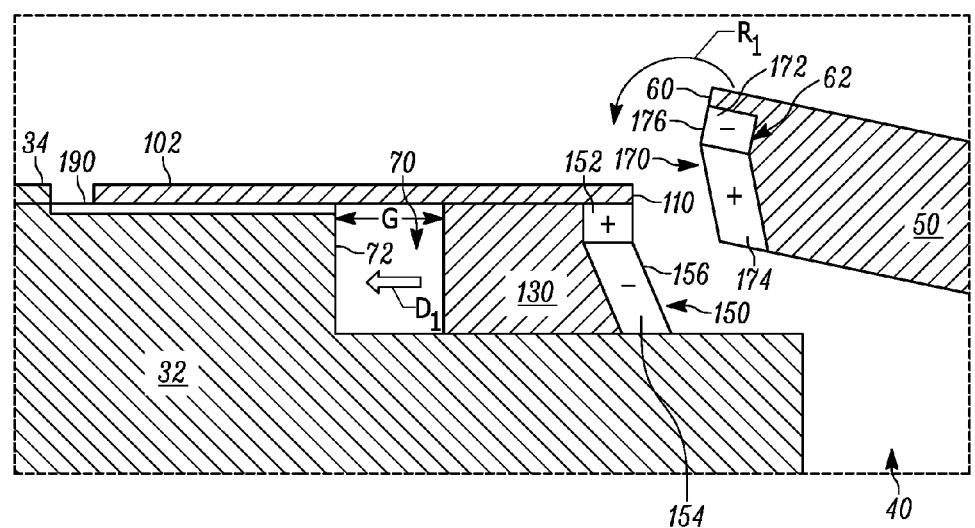
FIG. 4 is a schematic illustration of the door of FIG. 3 approaching a closed condition.

Referring to FIGS. 3-4, the door 50 is polygonal and has a perimeter 56 including an edge 60 that extends parallel to the edge 110 of the cover plate 102. As shown, the door 50 has a chevron shape, but could alternatively be square, rectangular, etc. A recess 62 extends parallel to the edge 60 of the door 50 along the underside thereof. The magnetic coupling 170 is provided in the recess 60 of the door 50. The magnetic coupling 170 includes third and fourth magnets 172, 174 stacked atop one another to define a coupling surface 176. The third and fourth magnets 172, 174 are contoured to the shape of the recess 62 in the door 50 and abut the door when the sealing mechanism 100 is assembled. The third and fourth magnets 172, 174 have opposite polarities from one another, e.g., the third magnet has a negative polarity and the fourth magnet has a positive polarity. Although two magnets 172, 174 are shown it will be appreciated that the magnetic coupling 170 can include more or fewer magnets. In one example, the magnetic couples 150, 170 have the same number of magnets.

The magnets 152, 154, 172, 174 in the magnetic couplings 150, 170 are configured to be correlated, or "coded", with one another. In other words, the magnets 152, 154, 172, 174 are arranged in correlated patterns with alternating polarity in FIG. 2. As shown, the first and third magnets 152, 172 have opposite polarities and the second and fourth magnets 154, 174 have opposite polarities.

The sealing mechanism 100 can include a retaining magnet 190 (see FIGS. 2-3) for connecting the cover plate 102 to the aircraft 30. The retaining magnet 190 is secured to the frame 32 of the aircraft 30 on at least one side of the opening 40. The retaining magnet 190 is recessed in the aircraft 30 relative to the OML 34 such that the cover plate 102 is co-planar/aligned with the OML when secured to the retaining magnet. It will be appreciated that the OML 34 and cover plate 102 will be co-planar if both have planar shapes around the opening 40 and aligned if both are curved/arcuate around the opening.

The materials of the retaining magnet 190 and the cover plate 102 are chosen such that the tensile strength of the magnetic force holds the cover plate 102 against the aircraft 30. The shear strength of the magnetic force, however, is weak enough to allow the cover plate 102 to slide along and relative to the retaining magnet 190.

Referring to FIGS. 3 and 4, the cover plate 102 is secured to the retaining magnet 190 such that the first end 104 of the cover plate 102 is located nearer the opening 40. The shuttle 130 is positioned behind the cover plate 102 within a recess 70 defined by inner surfaces 72, 73 extending around the opening 40. The shuttle 130 is sized such that a space or gap G is provided between the shuttle 130 and the inner surface 72. The gap G allows the shuttle 130 to slide within the recess 70 during operation of the door 50 and in-flight, as will be discussed.

When it is desirable to close the door 50 and cover the opening, e.g., to stow the landing gear 48 during flight, the door is rotated about the hinge 52 in a direction $R_1$ from an open condition towards a closed condition. As the door 50 closes, the fourth magnet 174 moves into proximity with the first magnet 152, i.e., the magnets 152, 174 move closer to alignment with one another. Since these magnets 152, 174 have the same polarity, the first magnet is repelled by the fourth magnet, thereby urging the cover plate 102, shuttle 130, and second magnet 154 secured thereto away from the door 50. In other words, there is a net repel force between the magnets 152, 174. As a result, the cover plate 102 and shuttle 130 slide longitudinally away from the door 50 in the direction indicated at $D_1$—out of the path of the rotating door.

The cover plate 102 maintains engagement with the retaining magnet 190 during longitudinal movement in the direction $D_1$ due to the magnetic connection therebetween. The shuttle 130 slides along the inner surface 73 of the frame 32 within the recess 70, thereby decreasing the gap G. This movement allows the door 50 to continue closing and ultimately move into contact with the inner surface 73 of the frame 32. The door 50 is therefore unobstructed as it moves towards the closed condition in the direction $R_1$.

Figure 5:
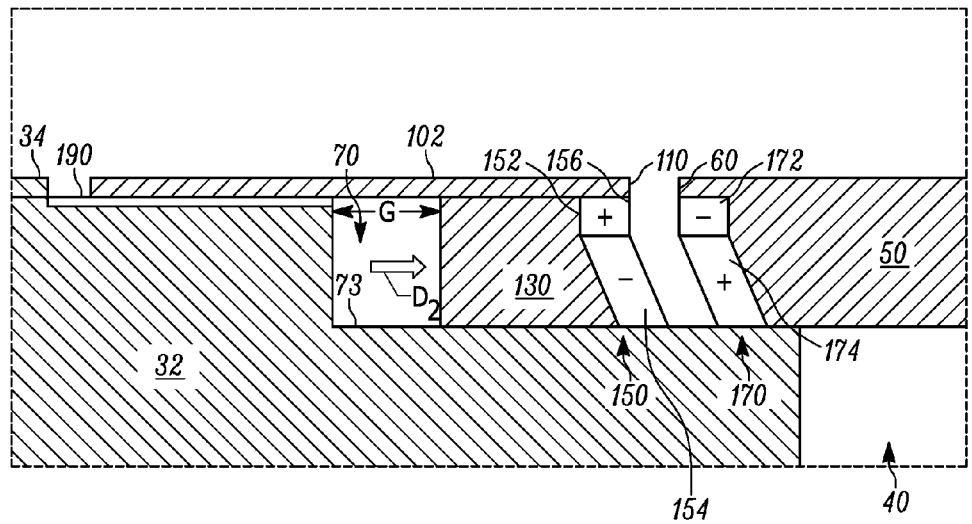
FIG. 5 is a schematic illustration of the door of FIG. 3 in the closed condition.
Figure 6:
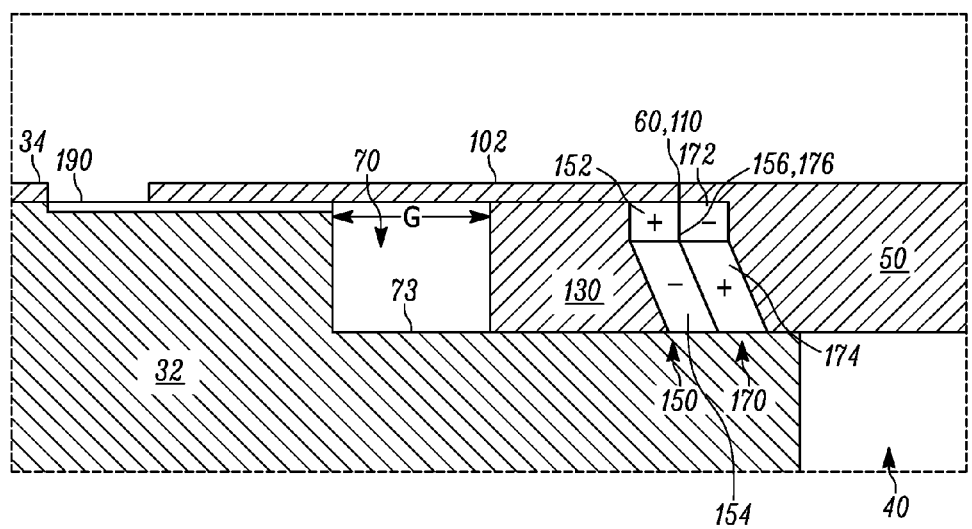
FIG. 6 is a schematic illustration of the door of FIG. 5 cooperating with the sealing mechanism to seal the opening in the aircraft.

As the door 50 closes, the magnetic interaction between the couplings 150, 170 change as the second magnetic coupling 170 moves into alignment with the first magnetic coupling 150. In one instance, the magnets 152, 154, 172, 174 become completely aligned with one another when the door 50 abuts the inner surface 73 (FIG. 5). More specifically, the first and third magnets 152, 172 become aligned with one another and the second and fourth magnets 154, 174 become aligned with one another. Since the magnets 152, 172 and 154, 174 in each respective aligned magnet pair have opposite polarity, the first magnetic coupling 150 is attracted to the second magnetic coupling 170, i.e., the first magnet 152 is attracted to the third magnet 172 and the second magnet 154 is attracted to the fourth magnet 174. Accordingly, there is a net attract force between the magnets 151, 154, 172, 174. As a result, the cover plate 102 and shuttle 130 slide with the first magnetic coupling 150 longitudinally towards the door 50 in the direction indicated at $D_2$ until the coupling surfaces 156, 176 abut one another. When this occurs, the edges 60, 110 of the door 50 and plate 102 can also abut one another.

The cover plate 102 maintains engagement with the retaining magnet 190 during longitudinal movement in the direction $D_2$ due to the magnetic connection therebetween. The shuttle 130 slides along the inner surface 73 of the frame 32, thereby increasing the gap G. When the coupling surfaces 150, 170 abut one another, the magnetic couplings resist relative movement between the door 50 and cover plate 102/shuttle 130 unit. As a result, the door 50 is held against the inner surface 73 of the frame 32, covering the opening 40 in an air-tight manner.

Figure 7:
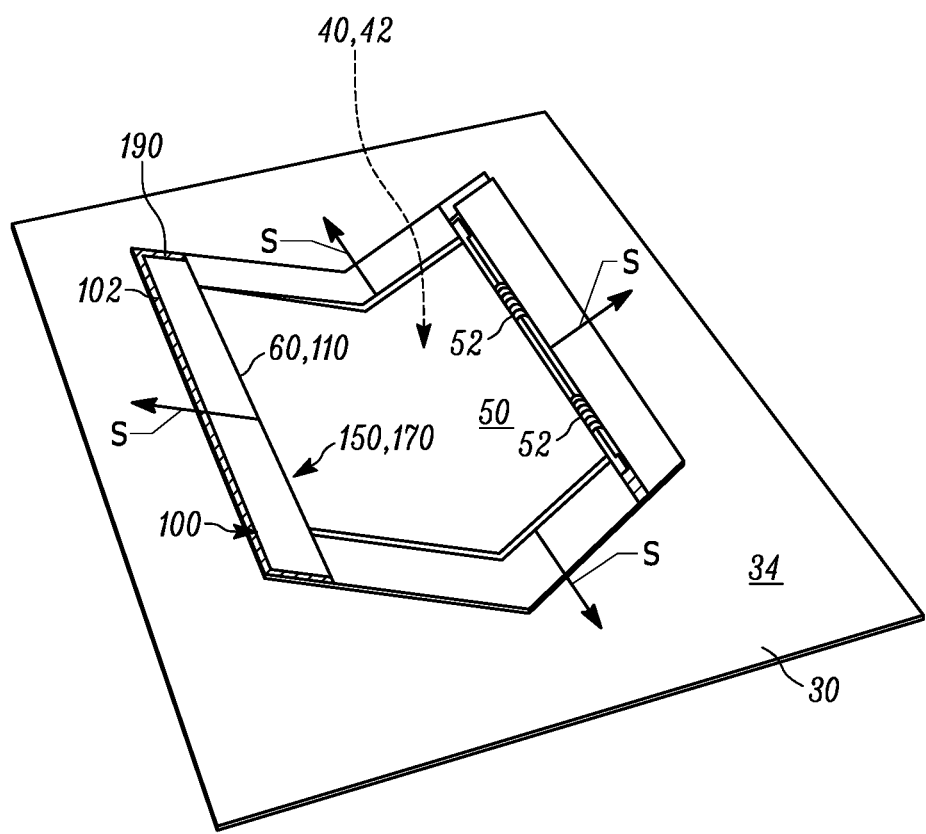
FIG. 7 is a schematic illustration of the entire sealed door of FIG. 6.
Figure 9:
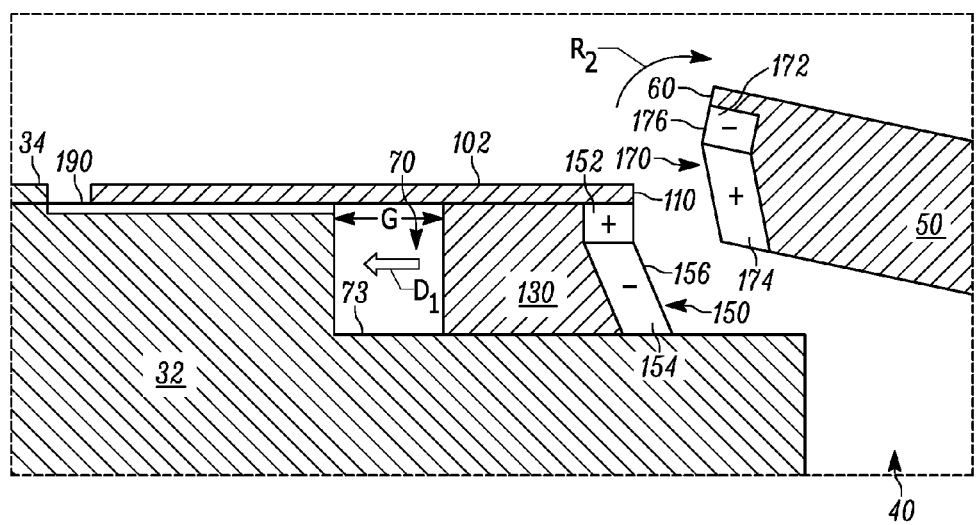
FIG. 9 is a schematic illustration of the door of FIG. 3 while being opened.

When it is desirable to open the door 50 and uncover the opening 40, e.g., to deploy the landing gear 48, the door 50 is rotated about the hinges 52 in the direction $R_2$ towards the open condition (FIGS. 7 and 9). Initially, relative movement between the door 50 and cover plate 102 is resisted due to the attraction between the magnetic couplings 150, 170. Consequently, the gap G remains unchanged and the shuttle 130 does not move.

Once the magnetic shear forces between the magnetic couplings 150, 170 are overcome, the second magnetic coupling 170 moves in the direction $R_2$ with the rotating door 50 relative to the first magnetic coupling 150. This moves the magnets 152, 154, 172, 174 out of alignment until the fourth magnet 174 is in proximity with the first magnet 152 (see FIG. 9). When this occurs, the first magnet 152 is again repelled by the fourth magnet 174 as there is a net repel force between the magnets. This urges the cover plate 102, shuttle 130, and first magnetic coupling 150 secured thereto away from the door 50. As a result, the cover plate 102 and shuttle 130 slide with the first magnetic coupling 150 longitudinally away from the door 50 and along the surface 73 in the direction $D_1$. Movement of the shuttle 130 in the direction $D_1$ allows the door 50 to freely move to the open condition and uncover the opening 40 (see FIG. 3). The cover plate 102 and shuttle 130 again remain connected to the aircraft 30 by the retaining magnet 190. The tensile magnetic force between the retaining magnet 190 and cover plate 102 is strong enough to keep the cover plate connected to the aircraft 30 when the door 50 is opened.

The magnetic sealing mechanism 100 of the present invention advantageously provides a floating cover plate 102/shuttle 130 unit configuration that automatically adjusts its position in response to movement of the door 50 and automatically seals the opening 40 when the door is closed. The floating cover plate 102/shuttle 130 unit also advantageously allows the door 50 seal to be maintained in-flight, when the door and/or cover plate 102 is susceptible to flexing due to manufacturing tolerances, installation tolerances, wind, etc.

Figure 8A:
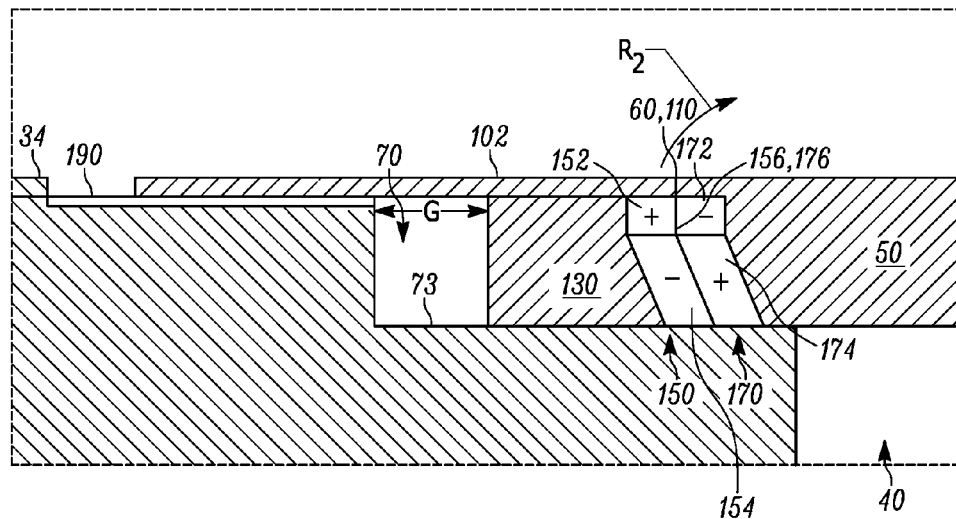
FIGS. 8A-8B is schematic illustrations of a portion of the sealed door of FIG. 7 during different in-flight conditions.
Figure 8B:
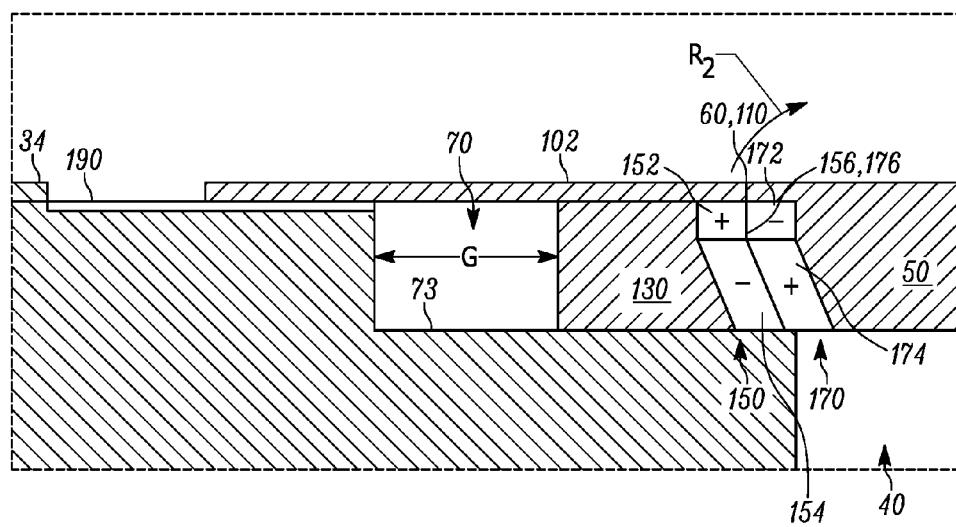

Referring to FIG. 7, when the aircraft 30 is in-flight and the frame 32 and door 50 stressed, the magnetic couplings 150, 170 remain connected due to the relatively high tensile magnetic forces. While this connection is maintained, the cover plate 102 and shuttle 130 can shift with the vibrating/flexing/etc. door 50 in any of the directions S owing to the magnetic connection between the cover plate and retaining magnet 190. An example of such shifting is illustrated in FIGS. 8A-8B in which the cover plate 102, shuttle 130, magnetic couplings 150, 170, and door 50 change position as a single unit relative to the retaining magnet 190 and recess 73, thereby changing the degree of the gap G. Due to this shifting capability, the sealing mechanism 100 helps ensure the cover plate 102 and door 50 maintain a sealed connection during flight. In other words, the sealing mechanism 100 allows the OML 34, cover plate 102, and door 50 to advantageously retain a co-planar/aligned relationship during the entirety of aircraft 20 flight. This is advantageous as it helps maintain a constant OML 34 for the aircraft 30, thereby providing a constant RCS in and around the door 50.

Figure 10:
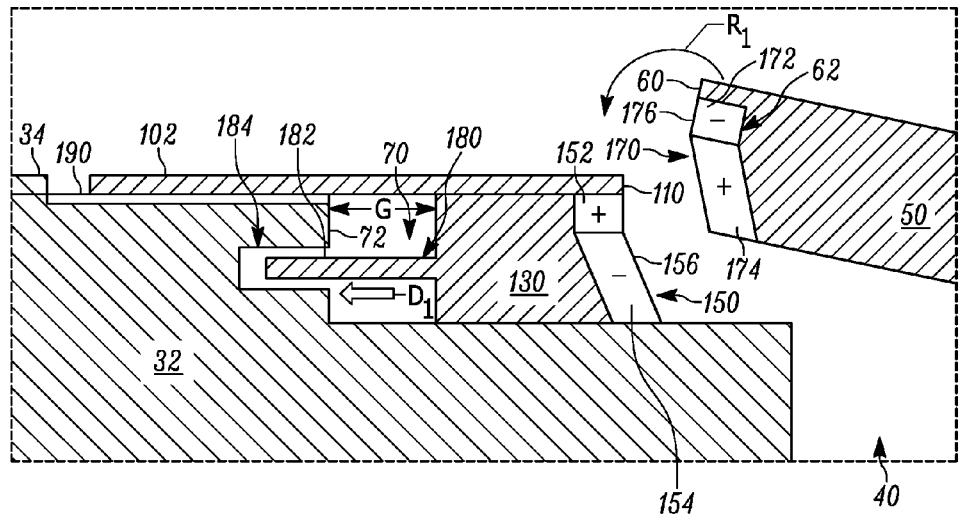
FIGS. 10-11 are schematic illustrations of alternative configurations of the door of FIG. 3.
Figure 11:
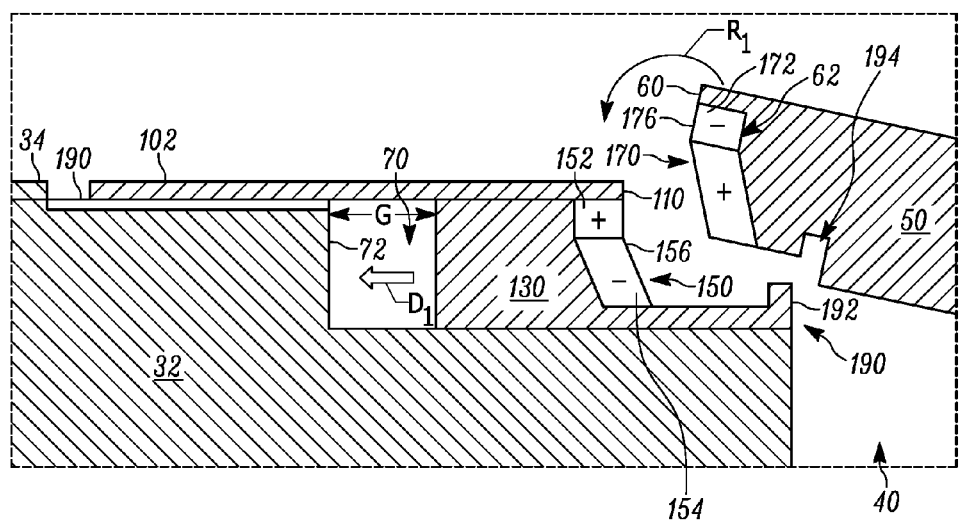

Referring to FIGS. 10-11, alternatively, or in addition to the retaining magnet 190, the cover plate 102 can be mechanically connected to the aircraft 30 using a mechanical retention system 180 or 190. Examples of such mechanical retention systems include, but are not limited to a living hinge, tongue-and-groove connection, springs or the like. In FIG. 10, the mechanical retention system 180 includes a shaft 182 integrally formed with or extending from the shuttle 130. The shaft 182 is configured to mate with a similarly shaped recess or cavity 184 formed in the frame 32. In FIG. 11, the mechanical retention system 190 includes a projection 192 extending from the shuttle 130 beneath the magnetic coupling 150 and towards the opening 40. The projection 192, in one example, is L-shaped and configured to mate with a recess or cavity 194 formed in the door 50 when the door is closed.

If a mechanical retention system is employed, the strength of the magnetic couplings 150, 170 used to seal the cover plate 102 over the opening 40 could be reduced. This is advantageous in that it mitigates any race horse effect that may occur between the magnetic couplings 150, 170 and retaining magnet 190 during opening and closing of the cover plate 102.

Although the present invention is illustrated with a single pair of magnetic couplings 150, 170 along the respective edges 60, 110 it will be appreciated that alternative or additional cooperating edges along the door/frame interface can include similarly configured magnetic coupling pairs. For example, the edge of the door 50 bearing the hinges 52 can include a magnetic coupling (not shown) that cooperate with a magnetic coupling on the frame 34 such that the hinges slides with accompanying shuttle. In any case, any magnetic couplings provided around the door 50 would be provided with a corresponding shuttle, cover plate, and retaining magnet similar to the shuttle 130, cover plate 102, and retaining magnet 190.

The magnets 152, 154, 172, 174 used in the couplings 150, 170 of the present invention are enhanced over conventional magnets by a printing press that draws an array of magnetic domains onto a larger piece of magnetic material. This produces a specific pattern of magnetic poles, providing unique characteristics, which include precision locating magnets that ensure the floating cover plate 102/shuttle 130 unit accurately and consistently locates the door 50. The precision magnets 152, 154, 172, 174 also allow for a very small surface mismatch between the shuttle 130 and door 50 and provide a repeatable system that snaps together quickly and correctly each time.

The use of coded magnets is advantageous for several reasons. Condensed field magnets are used to enhance magnet pull strength when the door 50 is in near-direct contact with the cover plate 102. In the present application, coded magnets 152, 154, 172, 174 are capable of providing about six times more pull strength than magnets of the same size and type compared to magnets that are not coded. As a result, coding the magnets 152, 154, 172, 174 allows the sealing mechanism 100 of the present invention to be smaller and lighter.

Furthermore, the self-locating feature reduces assembly and rigging time by allowing for a greater mismatch/misalignment between the cover plate 102, door 50, and OML 34. The sealing mechanism 100 of the present invention addresses the need for an advanced RCS seal that meets supportability and material availability requirements as well as providing low system maintenance, ease of assembly, and ease of manufacturing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A sealing system for an aircraft having an opening and a door movable between an open condition spaced from the opening and a closed condition covering the opening, the system comprising:
a cover plate connected to the aircraft adjacent the opening;
a first magnetic coupling secured to the cover plate and including a first plurality of magnets; and
a second magnetic coupling for securing to the door and including a second plurality of magnets, the first magnetic coupling being repelled by the second magnetic coupling when the couplings have a first degree of alignment with one another which causes the cover plate to move away from the door, the first magnetic coupling being attracted to the second magnetic coupling when the magnetic couplings have a second degree of alignment with one another greater than the first degree causing the magnetic couplings to engage one another and seal the opening in the aircraft.

2. The sealing system of claim 1, wherein the first plurality of magnets includes first and second magnets having opposite polarities and being stacked atop one another, the second plurality of magnets including third and fourth magnets having opposite polarities and being stacked atop one another.

3. The sealing system of claim 2, wherein the first and third magnets engage one another and the second and fourth magnets engage one another when the opening in the aircraft is sealed.

4. The sealing system of claim 2, wherein the first and second plurality of magnets constitute coded magnets.

5. The sealing system of claim 1, further comprising a shuttle secured to the cover plate and being slidable with the cover plate and the first magnetic coupling along an inner surface of the aircraft in response to magnetic interaction between the magnets.

6. The sealing system of claim 5, wherein the shuttle, the cover plate, and the first magnetic coupling slide together away from the door when the first and second magnetic couplings have the first degree of alignment with one another and slide together towards the door when the first and second magnetic couplings have the second degree of alignment with one another.

7. The sealing system of claim 5, wherein the shuttle is positioned within a recess of the aircraft behind the cover plate.

8. The sealing system of claim 5, wherein the shuttle is mechanically retained by at least one of the door and the aircraft when the magnetic couplings engage one another.

9. The sealing system of claim 1, further comprising a retaining magnet fixed to the aircraft and magnetically connected to the cover plate, the cover plate sliding over the retaining magnet and away from the door when the first and second magnetic couplings have the first degree of alignment with one another and sliding towards the door when the first and second magnetic couplings have the second degree of alignment with one another.

10. The sealing system of claim 9, wherein the cover plate is magnetically held against the retaining magnet when the magnetic couplings engage one another and is slidable along the retaining magnet relative to the aircraft to maintain a sealed connection with the door of the aircraft during flight.

11. The sealing system of claim 1, wherein the cover plate is sealed with the door of the aircraft when the magnetic couplings engage one another and slidable relative to the aircraft to maintain a sealed connection with the door of the aircraft during flight.

12. A sealing system for an aircraft having an opening and a door movable between an open condition spaced from the opening and a closed condition covering and sealing the opening, the system comprising:
a cover plate magnetically coupled to the aircraft adjacent the opening;
a shuttle secured to the cover plate and provided in a recess of the aircraft adjacent the opening;
a first magnetic coupling secured to the cover plate and including a first plurality of magnets; and
a second magnetic coupling for securing to the door and including a second plurality of magnets, the first magnetic coupling being repelled by the second magnetic coupling when the couplings have a first degree of alignment with one another such that the cover plate slides with the shuttle and first magnetic coupling away from the door, the first magnetic coupling being attracted to the second magnetic coupling when the magnetic couplings have a second degree of alignment with one another greater than the first degree such that the cover plate slides with the shuttle and the first magnetic coupling towards the door until the magnetic couplings engage one another and seal the opening in the aircraft.

13. The sealing system of claim 12, wherein the first plurality of magnets includes first and second magnets having opposite polarities and being stacked atop one another, the second plurality of magnets including third and fourth magnets having opposite polarities and being stacked atop one another.

14. The sealing system of claim 13, wherein the first and third magnets engage one another and the second and fourth magnets engage one another when the opening in the aircraft is sealed.

15. The sealing system of claim 13, wherein the first and second plurality of magnets constitute coded magnets.

16. The sealing system of claim 12, wherein the shuttle, the cover plate, and the first magnetic coupling slide together away from the door when the first and second magnetic couplings have the first degree of alignment with one another and slide together towards the door when the first and second magnetic couplings have the second degree of alignment with one another.

17. The sealing system of claim 12, wherein the shuttle is positioned within a recess of the aircraft behind the cover plate.

18. The sealing system of claim 12, further comprising a retaining magnet fixed to the aircraft and magnetically connected to the cover plate, the cover plate sliding over the retaining magnet and away from the door when the first and second magnetic couplings have the first degree of alignment with one another and sliding towards the door when the first and second magnetic couplings have the second degree of alignment with one another.

19. The sealing system of claim 12, wherein the cover plate is magnetically held against the retaining magnet when the magnetic couplings engage one another and is slidable along the retaining magnet relative to the aircraft to maintain a sealed connection with the door of the aircraft during flight.

20. The sealing system of claim 12, wherein the cover plate is sealed with the door of the aircraft when the magnetic couplings engage one another and slidable relative to the aircraft to maintain a sealed connection with the door of the aircraft during flight.

* * * * *